May 21, 1929.  W. B. RANNEY  1,713,554
MIXING MACHINE
Filed Aug. 2, 1926   2 Sheets-Sheet 1
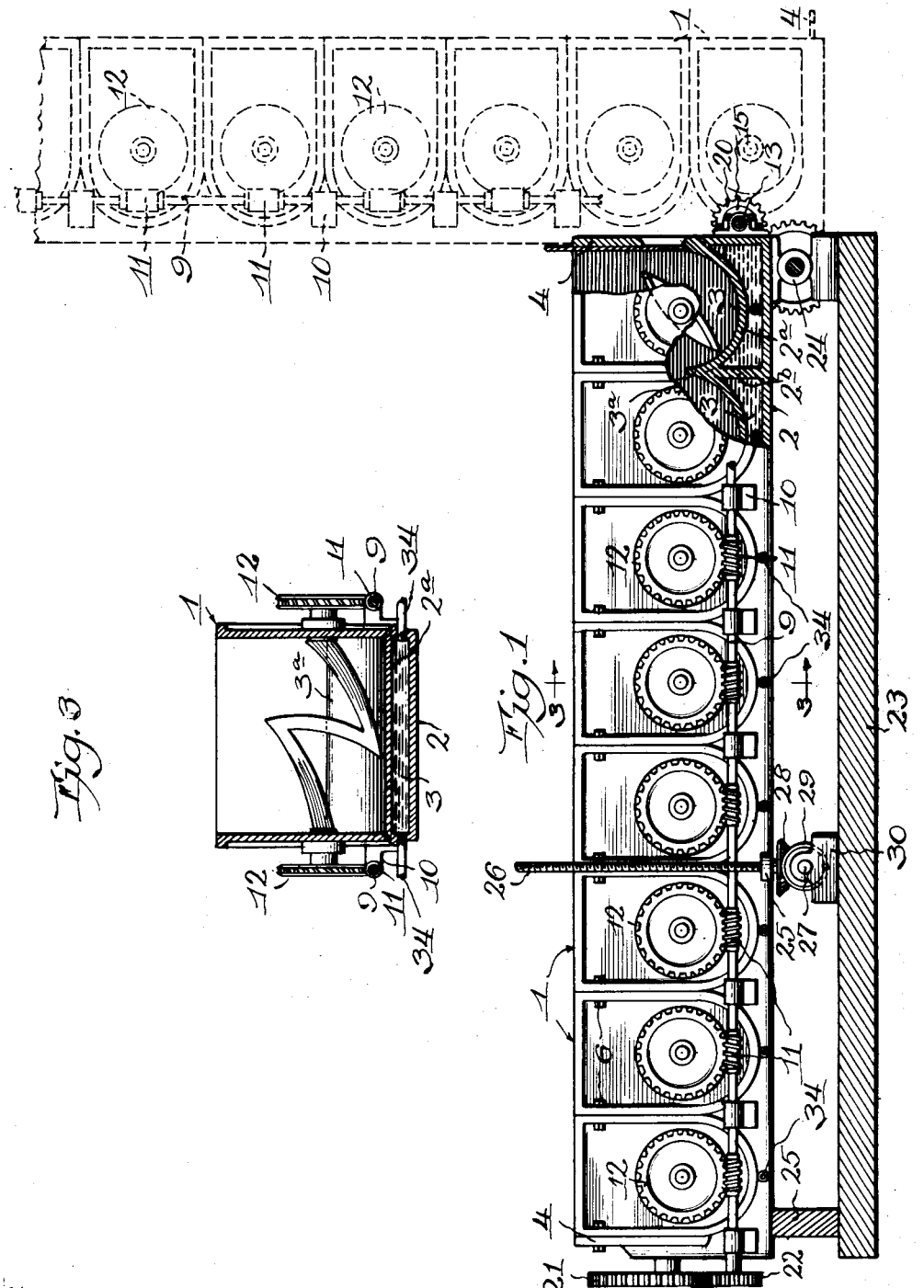

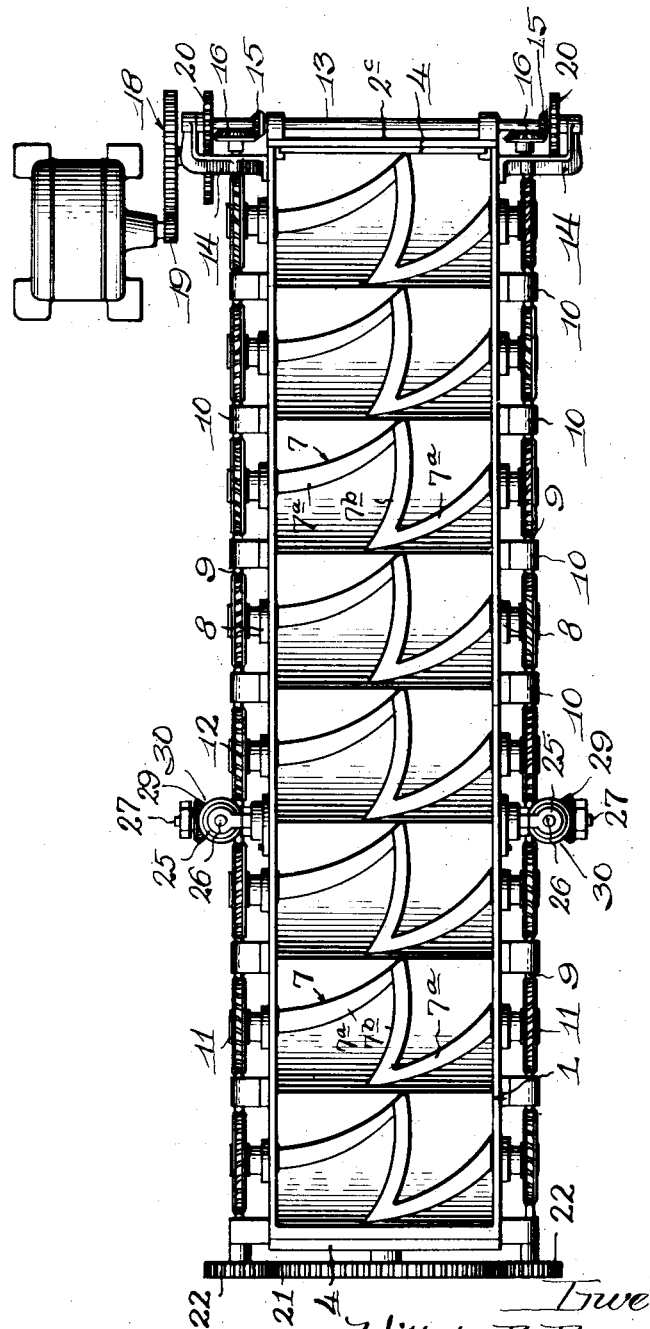

Patented May 21, 1929.

1,713,554

UNITED STATES PATENT OFFICE.

WILLET B. RANNEY, OF CHICAGO, ILLINOIS, ASSIGNOR TO WM. WRIGLEY JR. COMPANY, OF CHICAGO, ILLINOIS, A CORPORATION OF ILLINOIS.

MIXING MACHINE.

Application filed August 2, 1926. Serial No. 126,417.

This invention relates to mixing machines, and more particularly to machines adapted for use in various industries, such as the baking, rubber and like industries, the products of which are largely if not wholly the result of compounding of different ingredients.

The object of the present invention is to provide a new and novel construction for mixing machines, by introducing the principle of continuous operation, as distinguished from the repeating or intermittent principle which has been used heretofore.

The machine herein disclosed, is especially designed for use in the manufacture of chewing gum, for compounding the chicle and the various sweetening and flavoring ingredients, although the same features of construction are applicable to machines for other mixing operations.

The common practice in mixing the ingredients of chewing gum, has been to use a series or battery of separate mixing units, in the form of kettle-like tubs, provided with one or more masticating or mixing blades rotating within the tubs, the latter being driven to rotate about an axis relative to the mixing blade so as to secure a thorough working of the batch introduced therein. These units are separately charged with a batch of chicle, together with the flavoring and sweetening ingredients, and allowed to operate for the length of time necessary to complete the mixing operation, whereupon each unit is discharged, cleaned and a new batch put in. This method involves constant attention on the part of the operators since each unit must be attended to separately, and as a result, a great deal of time is lost and labor expended in discharging the units, cleaning the interior before recharging, and the handling of material discharged and to be charged.

With the introduction of a machine operating on the continuous principle, the material to be treated is introduced into the machine at one end and discharged at the opposite or tail end, successive batches or continuous streams of the materials being introduced into the machine so that there is a continuous progressive movement as the mixing proceeds, to the end that the finished product is discharged, either in a continuous stream or in intermittent batches as desired, by the manipulating of a suitable controlling mechanism at the discharge end.

A machine of this type is disclosed in the accompanying drawings, wherein

Figure 1 is a general view in side elevation of the machine.

Figure 2 is a top plan view of the machine.

Figure 3 is an enlarged detail view in vertical section taken on line 3—3 of Figure 1.

As clearly shown in the drawings, the apparatus consists of a series of eight upright receptacles 1, arranged side by side and thus forming a continuous row of mixing units. The number of units or receptacles may be varied as conditions require, as well as the size and dimensions. For practical purposes, each unit is about 1½ feet in depth, 2 feet in length and one foot in width (inside dimensions), thus giving the apparatus an overall length of about 8 feet.

The several units are incorporated into a structure the following construction being used. Extended throughout the entire length of the apparatus is a hollow base 2, consisting of bottom, side, and end walls and a top wall made up of a series of connected semi-cylindric wall sectors 2ª, forming a series of concave bottom walls for the several receptacles or mixing units which unite in beveled ridges or walls separating the units.

The space within the base 2 is divided into a series of compartments 3 by vertical partition walls 2ᵇ, extending the height of the base at the junctions of the several concave wall sectors 2ª, each receptacle thus being provided with a separate compartment beneath it and serving the purpose hereinafter to be set forth. The end walls of the base 2 are extended upwardly above the base 2, and form the end walls 4, 4 of the machine. The ends of the several mixing units are closed by side plates 5, having semi-circular lower end portions bearing against the edges of the sectors 3, and straight side flanges 5ª which abut against each other and connected together by bolts 6, the endmost plates being secured to the end walls 4, 4 in the same manner.

From the foregoing it will thus be seen that the several units practically form an elongated open trough except for the partial division brought about by the semi-circular bottom sectors.

Within each of the receptacles is a rotative mixing blade 7 of a rather peculiar formation, which may be best described as distorted Z-shape with the three branches warped and curved not only to conform to the curvature of the unit bottoms, but to give a certain movement to the material as it passes through one receptacle and overflows into the next. Thus as shown in the drawings, each blade 7 rotates about a horizontal axis extending lengthwise of each receptacle (i. e. transversely of the machine), and concentric with the bottom sector of its receptacle. The blades consist of three curved branches, the endmost branches 7$^a$ curving in opposite directions from the side walls toward the bottom sector 3, with an intermediate branch 7$^b$ extending crosswise between them. The edges of these branches adjacent the bottom and sides of the receptacle are beveled to knife edges which revolve in close proximity thereto, thus insuring a thorough and complete mixing of the material. These blades 7 are provided with journals 7$^c$ at each end, which turn in journal bearings 8, mounted on the end plates 6. The driving mechanism for these blades consists preferably of the following parts:

Extending along opposite sides of the receptacle and near the bottom of the machine, are two worm shafts 9, 9 extending the full length thereof. These shafts are supported in journal bearings 10, located between the units. Carried on the worm shafts 9 are worms 11, there being a pair of worms for each receptacle, located at opposite ends, and immediately below the axis of the blades 7 thereof. Fixed to the journals 7$^c$ of each blade are worm wheels 12, which mesh with the worms 11. As shown, all worms and worm wheels have the same gear ratio, and the shafts are driven at the same speed so that the rotation of the blades 7 is uniform and alternately in opposite directions, although the speeds may be varied and the direction of rotation of the blades altered by making suitable changes in the gearing. Moreover, the type of gearing used may be a matter of choice in design and construction.

The drive for the shafts 9 is located at the tail or right end of the machine, and consists of a shaft 13 extending transversely beyond the end of the machine and supported in journal brackets 14, 14 fixed to the base casting 2 (Figure 2). Keyed to the cross shaft 13, are beveled gear wheels 15, 15 which mesh with beveled gears 16, 16 fixed at the adjacent ends of the worm shafts 9. Mounted near the tail end of the machine is an electric motor 17 which drives the shaft 13 through a suitable train of reduction gearing 18 between the armature shaft pinion 19 and a spur gear 20 on said shaft 13.

The two worm shafts are also in driving connection at the head (left) end of the machine, through the medium of a large intermediate gear wheel 21 journaled on the tail end plate 4 and meshing with two small spur gears 22 at the ends of the worm shafts which manifestly rotate at the same speed and in the same direction.

The apparatus assumes a horizontal position in operating position, and as shown in the drawings, is mounted upon a suitable foundation 23. It is preferred, however, that the machine be capable of being tilted into a vertical position for cleaning purposes, and hence trunnions 24 support the machine at its tail end upon the foundation 23. The opposite or head end preferably rests on a block 25.

Any suitable means for elevating or tilting the machine may be employed, a convenient form being a pair of screw shafts 26, 26 located on opposite sides of the machine and a little more than one-half the length of the machine from the tail end. These screw shafts pass through threaded collars 27 carried on the sides of the base casting 2 of the machine. The lower ends of the screw shafts carry bevel gears 28, which mesh with other bevel gears 29 mounted on a cross shaft 30 extending beneath the machine and journaled in bearings 31 fixed to the foundation 23. The shaft 30 is driven by any suitable means, a motor with speed reduction gearing and reversing clutch mechanism being preferable.

As shown in Figure 1, the screw shafts normally stand in a vertical position, but as they are rotated in one direction, the threaded collars travel along the shaft thus swinging the entire machine upwardly about the trunnions to the vertical position shown in dotted lines. Manifestly, the screw shafts swing bodily with the machine and in its elevated position are inclined at an angle of 45°. The purpose of tilting the machines, as already explained, is to permit of periodic cleaning, usually after each run or period of machine operation. Thus by operating the blades with the machine empty and in elevated position, it will remove the accumulation of materials and leave it clean for the next run.

Speaking generally, the machine is operated by introducing the ingredients to be compounded at the head end and discharging the mass from the tail end and through an opening 32 provided in the end wall 4. This opening is provided with a gate 33 which regulates the amount of discharge, and also permits either a continuous or intermittent discharge.

The machine is initially charged by filling each receptacle to capacity with the ingredients to be mixed and the machine operated until the entire mass is reduced to proper consistency. At this point, fresh ingredients are added at the head end, whereupon the excess overflows into the next receptacle and gradually advances from unit to unit until the level of the material rises at the tail end of the machine. At this point, the discharge gate is opened sufficiently to permit the material to be discharged in the same proportion as the fresh ingredients are added.

The action on the mass of ingredients in each unit is both that of mixing and kneading, the blades acting to press the material against the sides of the receptacle, then carrying it upwardly; at the same time working it transversely from one end to the other. Thus as fresh materials are added, they are gradually mixed with the material already being treated, while a portion is constantly overflowing into the next receptacle; and so on, until the mass finally works its way to the tail end where each revolution of the blade therein brings a portion of the mixture to the discharge opening, to be wholly or partially discharged, depending on the size of opening as determined by the position of the gate. Thus a continuous advancing and agitating motion takes place from end to end of the machine as well as from end to end of each unit, thus insuring a complete and uniform product when finally discharged.

Referring now to the compartments 3, into which the base 2 is divided, the purpose of these compartments is to provide water or steam jackets for the bottom walls of the several units. Each compartment is therefore provided with inlet and outlet connections as at 34, whereby a fluid of required temperature can circulate through one or more of the compartments. Thus where it is desired to maintain the mixture at a higher temperature in the initial stages of the mixing operation, steam would be admitted to the compartments at the head end of the machine, or hot water if the temperature required is not so great. Likewise cold water is fed to the compartments where a cooling of the mixture is desired, thus making it possible to accurately control the temperature conditions throughout the entire mixing operation. The steam or water would be conducted to the machine from a suitable source of supply and distributed to the compartments by pipe or hose, with control valves for regulating the supply. Similarly pipes or hose connected with the outlet connections would allow the fluids to be discharged from the compartments.

As before mentioned, the continuous process, as carried out in the machine herein disclosed, eliminates the time and labor of handling and charging that exists in the operation of the present type of mixers. Moreover, there is no possibility of differences in consistency between different batches, since all of the material goes through the same process of treatment, and under constant working conditions.

Having set forth the essential features of a machine embodying the invention, I claim:

1. A mixing machine comprising an elongated open receptacle adapted to have the materials to be mixed fed continuously into one end thereof and provided at its opposite end with a discharge opening, a series of rotary mixing blades mounted in said receptacle and arranged in spaced relation throughout the length thereof, said blades being alternately driven in opposite directions whereby the materials are gradually reduced to a homogeneous mixture with an accompanying undulating flow toward the discharge opening of said receptacle.

2. A mixing machine comprising an elongated open receptacle having a bottom wall consisting of a plurality of concave transverse wall sections, a series of rotary Z-shaped mixing blades mounted in said receptacle above each of said concave wall sections, said blades being arranged in spaced relation throughout the length of said receptacle, means for driving said blades alternately in oposite directions whereby the materials continuously introduced at one end of said receptacle are gradually reduced to a homogeneous mixture flowing toward the other end and adapted to be discharged therefrom.

3. A continuous process mixing machine comprising a receptacle having a hollow base and a series of semi-cylindric bottom wall sections extending transversely throughout the length thereof, a series of rotary Z-shaped mixing blades mounted in said receptacle, each of said blades being located above one of said semi-cylindric wall sections, and means for driving said blades alternately in opposite directions of rotation.

4. A continuous process mixing machine comprising a receptacle divided longitudinally into a series of sections each having a semi-cylindric bottom wall, a series of rotary mixing blades extending throughout the length of said receptacle, each of said blades coacting with one of said sections to form a row of interconnected mixing units, and means for driving said blades at a uniform speed and in alternately opposed directions of rotation.

5. A mixing machine comprising a horizontally positioned receptacle adapted to have the materials to be mixed fed continuously into one end thereof, a series of rotary mixing blades mounted within said receptacle and arranged throughout the length thereof, said blades being driven in alternately opposite directions whereby the materials are gradually reduced to a homogeneous mixture with an accompanying undulating flow toward the opposite end of said receptacle from which the same is continuously discharged.

Signed at Chicago this 19th day of July, 1926.

WILLET B. RANNEY.